United States Patent [19]

Laprade et al.

[11] 4,383,673
[45] May 17, 1983

[54] DUMMY LENS FOR MOLDED-TO-SHAPE EYEGLASS FRAME FRONTS AND MOLDS THEREFOR

[75] Inventors: Gérard Laprade, St. Maur; Jean-Pierre Marouby, Bobigny; Charly Bertin, Issy-les-Moulineaux, all of France

[73] Assignee: Essilor International, Cie Generale d'Optique, Creteil, France

[21] Appl. No.: 220,149

[22] Filed: Dec. 23, 1980

[30] Foreign Application Priority Data

Dec. 28, 1979 [FR] France ................................ 79 31919

[51] Int. Cl.³ .......................... B29C 1/00; B29D 11/00; B29F 1/00
[52] U.S. Cl. ...................................... 249/142; 425/808; 425/DIG. 58
[58] Field of Search ....... 249/142; 425/808, DIG. 58, 425/129 S

[56] References Cited

U.S. PATENT DOCUMENTS

| | | | |
|---|---|---|---|
| 3,104,425 | 9/1963 | Crane et al. | 249/142 X |
| 3,228,070 | 1/1966 | Gill | 425/808 |
| 3,266,100 | 8/1966 | Belanger | 425/DIG. 58 |
| 3,387,334 | 6/1968 | Belanger et al. | 425/DIG. 58 |
| 3,406,232 | 10/1968 | Barker | 425/808 |
| 3,531,869 | 10/1970 | Hays et al. | 425/DIG. 58 |
| 3,915,608 | 10/1975 | Hayik | 425/129 S X |
| 4,161,060 | 7/1979 | Lenne et al. | 425/808 |

FOREIGN PATENT DOCUMENTS 436421 10/1935 United Kingdom .
565161 10/1944 United Kingdom .

*Primary Examiner*—J. Howard Flint, Jr.
*Attorney, Agent, or Firm*—Charles A. Brown

[57] ABSTRACT

A dummy lens for molded-to-shape eyeglass frame front molds including mold halves defining rim forming channels and a central bridge forming channel. The dummy lens comprises a lenticular disc having a periphery ridge adapted to define the groove for the ultimate ophthalmic lens and an axial projection extending from the concave side of the disc and having a cylindrical portion for centering the dummy lens and a tapered portion at its free end defining a draft. The disc and the tapered free end of the dummy lens bear against respective opposed plateaus of the half molds.

8 Claims, 9 Drawing Figures

U.S. Patent    May 17, 1983    Sheet 1 of 2    4,383,673
PRIOR ART
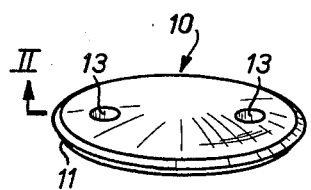
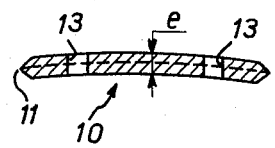
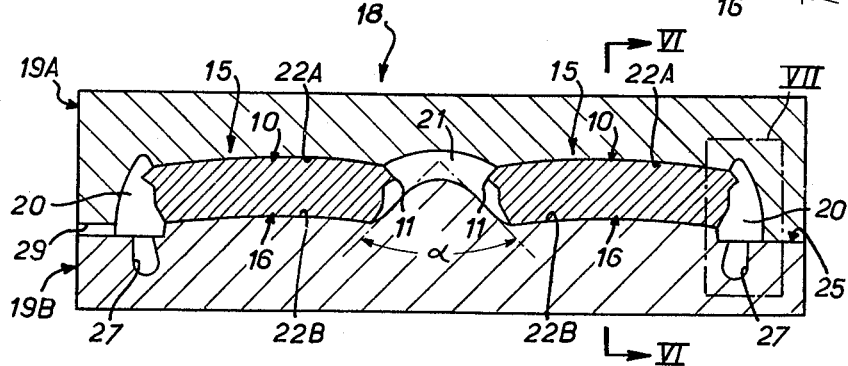
FIG. 6
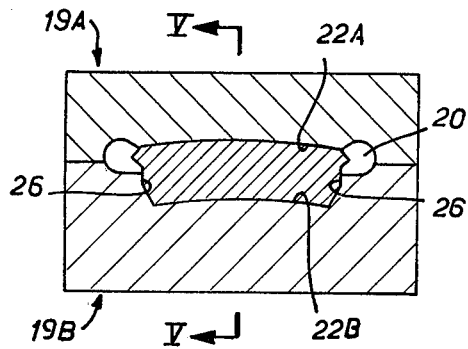

DUMMY LENS FOR MOLDED-TO-SHAPE EYEGLASS FRAME FRONTS AND MOLDS THEREFOR

BACKGROUND OF THE INVENTION

The present invention relates generally to molding eyeglass frame fronts to shape.

As is known, an eyeglass frame comprise a front including two rings or rims interconnected by a central bridge portion, each of the rings or rims being adapted to receive an ophthalmic lens, and two temple or side parts hinged to the front, the temple or side parts being provided with thickened portions or lugs for embedding knuckles.

When the eyeglass frame is made of synthetic organic material known as plastic, the front may be made by machining a plaquette or plate made of the plastic. But this is a relatively expensive method requiring skilled labor.

DISCUSSION OF THE PRIOR ART

Such a frame front may be advantageously made by molding the plastic material to the desired configuration. By the term "molding to the desired configuration" or "molding to shape" we mean molding which results directly in the ultimate sought after configuration of the part thereby enabling all touch-up machining of the part to be avoided.

Customarily, such molding to shape is accomplished by the use of a mold comprising two mold halves which together define between each other two annular rim forming channels which are connected to each other by a central bridge portion forming channel, and which border on plateaus, and two dummy lenses, one for each annular rim forming channel adapted to bear against the corresponding plateaus of the mold halves.

These dummy lenses are required to form the desired rim configurations with grooves adapted to receive ophthalmic lenses, failing which such grooves or bezels must be formed after molding by machining.

In practice, such dummy lenses employed to date are in the form of a simple lenticular disc the periphery of which has an annular ridge adapted to form the groove or bezel.

By the word "disc" we mean a piece of essentially two-dimensional configuration, the thickness being the third dimension, perpendicular to the first two, and corresponding, in such prior art constructions, to the width of the ultimate groove.

During molding each dummy lens bears against the corresponding plateaus of the mold halves, the plateau of one of the half molds on one of its sides and the plateau of the other half mold for the other of its sides.

Upon unmolding, the dummy lenses which are held in the rims of the frame fronts are removed by elastic deformation of the constituent material.

Although such a method has been found satisfactory it involves manufacturing constraints which result in limitations in the potential configuration of the frame fronts. These manufacturing constraints are due to the fact that at the temple side on the back surface of the frame front there are locally thicker zones forming the lugs and also adjacent the bridge portion thicker zones forming bridge rests.

Owing to such locally thicker zones protruding from the back face of the frame front, the plateaus of the mold half corresponding to the back face are of considerable height relative to the parting plane of the mold halves in line with the locally thicker zones.

Taking into account the draft necessary for unmolding the inner edge of the lugs is therefore gradually shifted outwardly from the rims or rings to the temples. Yet such a lug must compulsorily be of minimum height necessary for embedding a knuckle or insert. Consequently the external edge of the lug is also gradually shifted outwardly owing to the shifting of its inner edge. Hence the lugs of the eyeglass frame fronts made by molding to shape, all things being equal, protrude considerably outwardly which may tend to make the overall configuration of such frame fronts heavier or clumsy.

Likewise, at the nose bridge side the requisite draft for unmolding leads to a reduction of the overall width available for the nose bridge and the bridge rests, which is bound to give rise to certain problems of wearer comfort and adaptation when the particular frame front is for a person having a relative wide nose bridge.

SUMMARY OF THE INVENTION

A general object of the present invention is the provision of solution which at least minimizes or even entirely eliminates these drawbacks.

According to a first aspect of the invention there is provided a dummy lens for a mold for molding an eyeglass frame front of the type having a disc and an annular periphery defining a ridge for forming a groove. The dummy lens is characterized in that it has an axial projection protruding from one of the sides of the disc set back from the periphery thereof. According to another aspect of the invention there is provided a mold adapted to be used with such dummy lenses.

Preferably, the end of the axial projection of such a dummy lens is of generally frustoconical configuration tapering away from the disc.

In any event since the dummy lens according to the invention has such an axial projection the height of the plateaus at the temple side and at the nose bridge side relative to the parting plate of the mold for bearing the mold half intended to form the back surface of the frame front, is therefore reduced a corresponding amount whereby the consequences of the requisite draft for unmolding on the outward shifting of the lugs as well as the reduction of the available width for the central bridge portion and the bridge rests are minimized accordingly.

In other words, all conditions being equal, the utilization of dummy lenses according to the invention permits the lugs to be closer together and therefore a reduction of the outward projection thereof and/or an increase of the included angle, also known as the rake angle, between the bridge rests.

From the reduction of the outward projection of the lugs results, advantageously, an improved esthetic quality of the front as a whole which without the need for touch-up machining after molding may have a markedly finer configuration than frame fronts produced in accordance with the prior art.

Likewise, from the increase of the angle included between the bridge rests advantageously results better adaptation, enhanced wearer comfort, particularly when the wearer has a wide nose bridge.

Furthermore the axial projection on such a dummy lens permits, if desired, the elimination of studs employed for locating or centering the dummy lenses relative to the mold halves, the extension itself may effect such centering as it is inserted in the half mold forming back face of the ultimate frame front.

These and other features and advantages of the invention will be brought out in the description which follows, given by way of example, with reference to the accompanying schematic drawings.

BRIEF DESCRIPTION OF THE DRAWINGS

FIG. 1 shows a perspective view of a dummy lens according to the prior art;

FIG. 2 shows a cross-sectional view of the dummy lens in FIG. 1 taken on line II—II therein;

FIGS. 3 and 4 show views similar to these of FIGS. 1 and 2 for a dummy lens embodying the invention;

FIG. 5 shows a longitudinal sectional view of a mold incorporating the dummy lenses embodying the invention, taken on line V—V in FIG. 6;

FIG. 6 shows a transverse sectional view taken on line VI—VI in FIG. 3;

DETAILED DESCRIPTION OF THE PREFERRED EMBODIMENT

Figure 7:
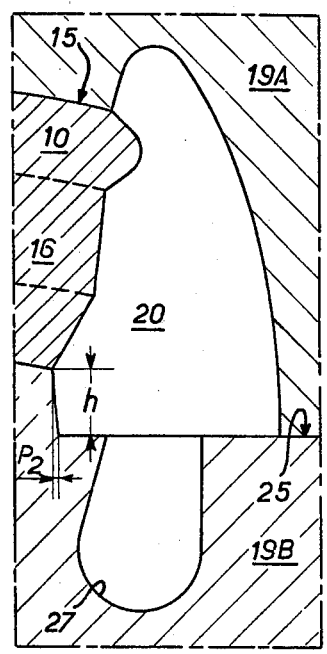
FIG. 7 shows, on an enlarged scale, a detail included in a phantom line rectangle VII in FIG. 5.

In FIGS. 1 and 2 one will recognize a dummy lens 10 of the type usually employed at the present day in molds adapted to cast eyeglass frame fronts to shape. Such a dummy lens 10 consists, in practice, of a simple lenticular disc the contour or periphery of which corresponds to that of the corresponding rim of the ultimate frame front, the periphery having an annular ridge 11 adapted to form a groove or bezel in the rim of the frame front for accommodating the lens therefor. The disc is relatively thin, in practice, corresponding to the width of the groove or bezel to be formed. Also, as shown, the disc is generally dished to the curvature of the rim or ring to be formed. Typically, such a dummy lens 10 has two holes 13 for receiving locating or centering studs as will be described hereinbelow.

As illustrated in FIGS. 3 and 4 a dummy lens 15 according to the invention not only has a disc with a peripheral ridge 11 such as shown in the prior art dummy lens of FIGS. 1 and 2 but in addition an axial projection 16 from one of the sides of the disc set back from the periphery of the dummy lens. The total width E of the dummy lens is substantially thicker than the width e of the dummy lens of the prior art.

In the illustrated embodiment the axial projection 16 is in one-piece with the disc 10 and it extends from the concave surface thereof.

At least a first part of the height of the projection 16 is, for example, cylindrical, as shown. Preferably and as shown, its free end tapers and therefore defines a draft $P_1$.

As is shown per se and illustrated in FIG. 5, the mold 18 adapted for the dummy lenses 15 according to the invention comprises, other than the two dummy lenses 15, two half molds 19A, 19B mutually defining two annular channels 20 for the rims which are connected to each other by a central bridge portion 21 and border on two plateaus 22A, 22B, one on each mold half for bearing against the corresponding dummy lens 15 which is provided for each rim 20.

The mold halves 19A and 19B are in contact with each other along a parting line (not shown in detail) in the drawings locally forming in the illustrated embodiment a planar reference surface 25 at the longitudinal ends of the mold halves.

The dummy lenses 15, according to the invention, are directly anchored by their projection 16 into mold half 19B which is intended to form the back face of the frame front, the plateaus 22B of the mold half 19 being laterally set back in relation to the annular channels 20 for the rims, FIG. 6, thereby providing lateral wall portions 26 for effecting centering.

At the temple side the annular rim forming channels 20 have a locally widened portion or lug projecting laterally and rearwardly on to the surface to be obtained, and they communicate with cavities 27 in mold half 19B which are adapted to receive inserts forming knuckles for hinges.

Similarly, on the nose bridge side the annular rim forming channels 20 have a locally widened portion adapted to form the rearwardly protruding bridge rests.

A pouring gate 29 for the plastic material to be cast opens at one of the longitudinal sides of the mold halves 19A and 19B.

According to the invention and by reason of the axial projections 16 of the dummy lenses 15, the plateaus 22B of mold half 19B are on the temple side and relative to the plane part 25 of the parting surface taken as the reference surface, of reduced height h, see FIG. 7. This height h may be positive as is the case on the temple side in the illustrated embodiment. It may also be zero as in the case of the bridge side in the illustrated embodiment. It may also be negative in case the projections 16 of the dummy lenses 15 are greater and penetrate into cavity of the mold half 19B both laterally between wall portions 26 and longitudinally on the temple side and/or bridge side. In any event the draft $P_2$ necessary for unmolding, FIGS. 7–9, extends over this height h.

Figure 8:
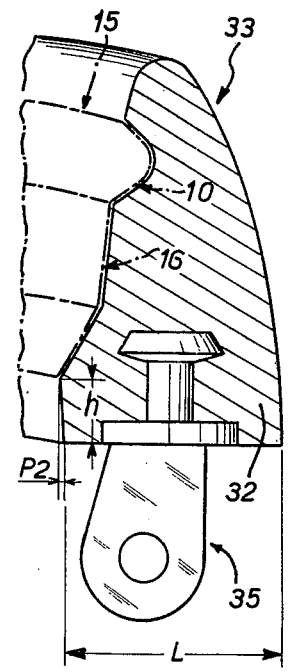
FIG. 8 shows, on the scale of FIG. 7, a transverse sectional view of the frame front resulting from the use of the mold.

The effects of the draft $P_2$ on the outward shifting of the knuckles 32 formed on the surface 32 is thus minimized owing to the height h of the plateaus 22B at this location, FIGS. 7 and 8, which is itself minimized, the draft being effective only over the same height h of the knuckles.

Figure 9:
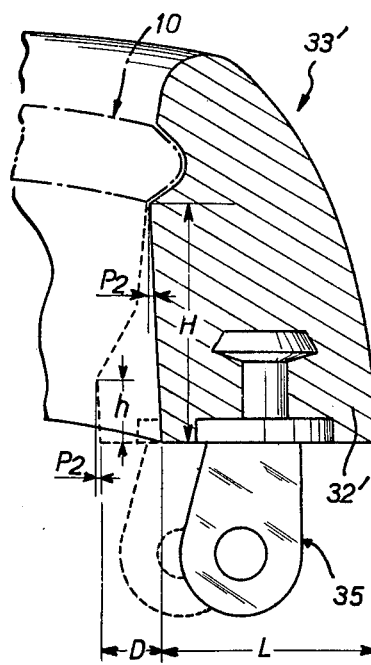
FIG. 9 shows, by way of comparison, on the same scale as FIG. 8, a sectional view of the frame front resulting from use of a molding incorporating the dummy lenses of the type illustrated in FIGS. 1 and 2.

To illustrate the advantages of the invention in this respect, in FIG. 9 is shown in solid lines a frame front 33' obtained by use of the dummy lenses 15 and in dashed lines for the effects of the draft $P_2$ effective along a greater height H of the corresponding knuckle 32' and therefore greater, and in phantom lines in the same figure, by way of comparison, the knuckle 32 obtained, all other conditions being equal.

It clearly follows from FIG. 9 that the use of the dummy lenses 15, according to the invention represented in phantom lines in FIG. 8, advantageously permits an inward shift D of the knuckle 32, and therefore for a given lug width L for mounting the insert or knuckle 35, a reduction of the projection such a lug at the temple side: this advantage is accentuated by the frustoconical configuration of the free end of the projection 16 of the dummy lenses.

There is a similar advantage for the bridge side where the included angle $\alpha$ between the bridge rests is increased.

Furthermore, as the reader will have understood, in the illustrated embodiment, the fact that the projection 16 of the dummy lens 15 has a first cylindrical part which permits, as is usually the case, the insertion of the ophthalmic lenses into the resultant frame front, which lenses independently of the requisite annular ridge for their mounting in the corresponding groove or bezel are generally cylindrical as is the case for high power ophthalmic lenses.

Of course the present invention is not limited to described and illustrated embodiment but encompasses all variations, modifications and alternatives understood by those skilled in the art without departing from the scope of the appended claims.

In particular the dummy lenses according to the invention may be in two suitably superposed parts, a disc and a projection on condition that the parts are suitable adjusted relative to each other.

Further, and even though this arrangement contributes to the sought after results, it is not mandatory that at least the free end of the projection of the dummy lens be frustoconical or in any event it is not mandatory that the draft of the projection at its free end affect the entire annular periphery thereof. It would suffice for this draft to be effective locally on the temple side for the lugs to be formed and/or the bridge side for the bridge rests to be formed.

What we claim is:

1. A dummy lens for a mold for an eyeglass frame front, the dummy lens being of the kind having a disc with a periphery having an annular ridge having inner and outer diameters and being adapted to form a groove, the improvement wherein the dummy lens has an axial projection on one side only of the disc set back from the periphery thereof, said projection having a diameter at said disc corresponding to said inner diameter of said ridge, and said projection having a peripheral surface in the form of a mold surface.

2. The dummy lens of claim 1, wherein at least the free end of said axial projection is tapered.

3. The dummy lens of claim 1, wherein there is provided in the vicinity of said axial projection a local draft.

4. The dummy lens of claim 1, wherein there is provided in the vicinity of the free end of said axial projection and along the entire annular periphery a draft.

5. The dummy lens of claim 1, wherein said disc is dished, and said axial projection extends from the concave side of said dished disc.

6. The dummy lens of claim 1, wherein the height of the entire dummy lens is substantially greater than that of said disc itself.

7. The dummy lens of claim 1, wherein said disc and said axial projection are constructed and arranged to bear against plateaus running inwardly of rim forming channels of eyeglass frame front mold halves to be employed therewith.

8. An eyeglass frame front mold comprising two mold halves for defining two rim forming annular channels connected to each other by a bridge forming central channel, said channels bordering onto opposed pairs of plateaus, and two dummy lenses insertable inwardly of the rim forming channels, each of said dummy lenses having opposite faces and comprising a lenticular disc with a periphery having an annular ridge for forming a groove for receiving an ophthalmic lens and an axial projection on one side only of said disc set back from the periphery thereof, said dummy lenses including said axial projections defining the rim forming channels inwardly and said opposite faces of said dummy lenses bearing against the corresponding opposed pairs of plateaus.

* * * * *

UNITED STATES PATENT AND TRADEMARK OFFICE
CERTIFICATE OF CORRECTION

PATENT NO. : 4,383,673
DATED : May 17, 1983
INVENTOR(S) : Gerard Laprade et al

It is certified that error appears in the above-identified patent and that said Letters Patent are hereby corrected as shown below:

Claim 1, line 6, after "axial" insert -- eyeglass frame rim forming --.

Claim 2, line 2, after "axial" insert -- eyeglass frame rim forming --.

Claim 3, line 2, after "axial" insert -- eyeglass frame rim forming --.

Claim 4, line 2, after "axial" insert -- eyeglass frame rim forming --.

Claim 5, line 2, after "axial" insert -- eyeglass frame rim forming --.

Claim 7, line 2, after "axial" insert -- eyeglass frame rim forming --.

Claim 8, line 12, after "axial" insert -- eyeglass frame rim forming --.

Signed and Sealed this

Fourteenth Day of February 1984

[SEAL]

Attest:

GERALD J. MOSSINGHOFF

*Attesting Officer*   *Commissioner of Patents and Trademarks*